W. MAIER.
CUTTING MACHINE.
APPLICATION FILED NOV. 5, 1918.

1,318,892.

Patented Oct. 14, 1919.
7 SHEETS—SHEET 1.

Inventor:
William Maier,
By Hugh K. Wagner,
Attorney.

W. MAIER.
CUTTING MACHINE.
APPLICATION FILED NOV. 5, 1918.

1,318,892.

Patented Oct. 14, 1919.
7 SHEETS—SHEET 6.

Inventor:
William Maier
By Hugh K. Wagner,
Attorney.

W. MAIER.
CUTTING MACHINE.
APPLICATION FILED NOV. 5, 1918.

1,318,892.

Patented Oct. 14, 1919.
7 SHEETS—SHEET 7.

Inventor:
William Maier.
By Hugh K. Wagner,
Attorney.

UNITED STATES PATENT OFFICE.

WILLIAM MAIER, OF ST. LOUIS, MISSOURI.

CUTTING-MACHINE.

1,318,892.   Specification of Letters Patent.   Patented Oct. 14, 1919.

Application filed November 5, 1918. Serial No. 261,181.

*To all whom it may concern:*

Be it known that I, WILLIAM MAIER, a citizen of the United States, residing at the city of St. Louis, State of Missouri, have invented certain new and useful Improvements in Cutting-Machines, of which the following is a specification.

This invention is a machine adapted to cut off lengths of material from stock fed to the cutting machine, which is provided with knives or cutters. This machine is adapted to cut any kind of material such as metal, cloth, or paper, and is especially useful for cutting strawboard, pasteboard, plasterboard, container board, fiber board, chip board, corrugated paper, double-faced paper, paper tubes, felt, veneer, and the like.

In preparing articles for the market and blanks for boxes and lids that are selling in large numbers and of a standard size, or of standard sizes, it is necessary that the cutting shall be done by automatic machinery, and that each piece, when cut, shall be of size identical with its fellows. To accomplish this, an automatic feed, an accurately timed cutting operation, and an instantaneous release and continuation of feed are essential. To accomplish this is the purpose of this machine.

In the accompanying drawings forming part of this specification, in which like numbers of reference denote like parts wherever they occur.

Figure 1:
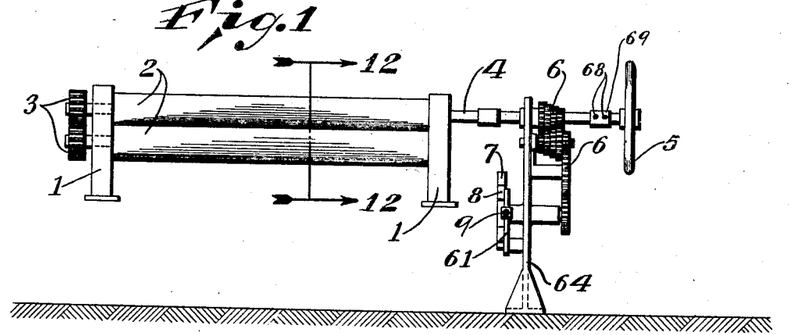
Figure 1 is a side elevation of the timing mechanism, taken on the line 1—1 in Fig. 3.
Figure 2:
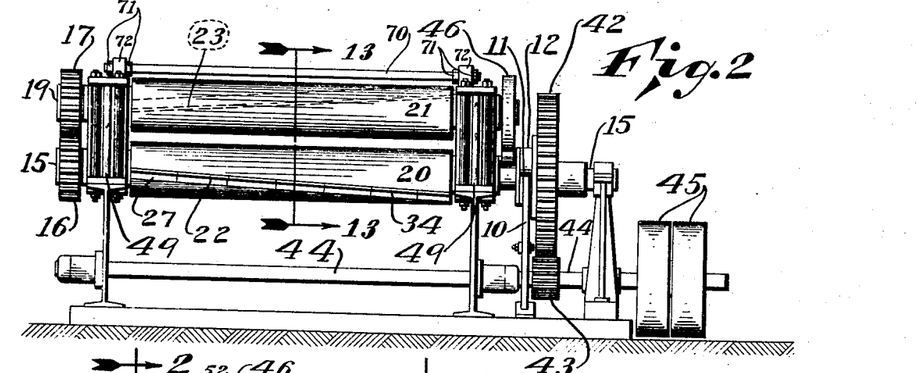
Fig. 2 is a side elevation of the cutting machine, taken on the line 2—2 in Fig. 3.

The pasting or double-face paper machine or receptacle containing a supply of material to be cut or stock of such material in any form, is not shown in the drawings, but it is to be understood that the machine depicted in Fig. 1 will be bolted thereto or fastened in juxtaposition thereto in any suitable manner, the same being necessarily held or mounted in a substantial, rigid manner, and for convenience and economy of factory space, being preferably near to the source of material to feed the machine of Fig. 1, and from it to the machine of Fig. 2.

The standards 1 support the timing rolls 2, one of which is operated from the other by the gears 3, power being applied by material being fed through the timing rolls 2. The rolls 2 are geared together so as to bring more power to the top roll by way of friction. It will be understood that any suitable mechanical expedient may be employed to operate said timing rolls. Also suitable feeding means, not shown, may be employed to secure efficiency in operation.

The hand-wheel 5 is used to operate the clutch in cutting off first end of paper or cutting bad spots out of paper.

A train of time gears 6 regulates the frequency of engagement of cam 7 with roller 8 and consequent thrust of rod 9, whereby the end of rod 10 is disengaged from the shoulder 11 on clutch member 12, whereby the clutch as a whole is allowed, by reason of clutch disk 13 and notched ring 31 being keyed to shaft 15 in combination with rollers 53 and cage 12 to rotate the said shaft 15 and thereby, through the intervention of gears 16 and 17, to rotate shaft 19 and the rolls 20 and 21 mounted thereon and thus to rotate the coöperative knives 22 and 23 mounted on the rolls 20 and 21 respectively. There are forty-one change gears, having from eighty to one hundred and twenty teeth, adapted to cut lengths from thirty to one hundred and twenty inches.

The gears 6 are of such sizes as to allow innumerable permutations, thus enabling control through them of the stock being fed between rolls 2 and also of the length of travel of the said stock therethrough and between rolls 20 and 21 before the aforesaid thrust of rod 9 disengages rod 10 from shoulder 11 and the consequent actuation of the cutter rolls 20 and 21. The top roll 2 operates the cone and change gears. They in turn actuate the cam 7. On account of the necessity of precision in the size of the pieces cut by this mechanism, it is necessary that the clutch that causes the actuation of the cutter rolls 20 and 21 shall take instanter at the right moment and that the same shall release with almost equal quickness or suddenness. The clutch hereinafter to be described has been especially devised for these and other useful purposes.

Figures 13, 14, 15:
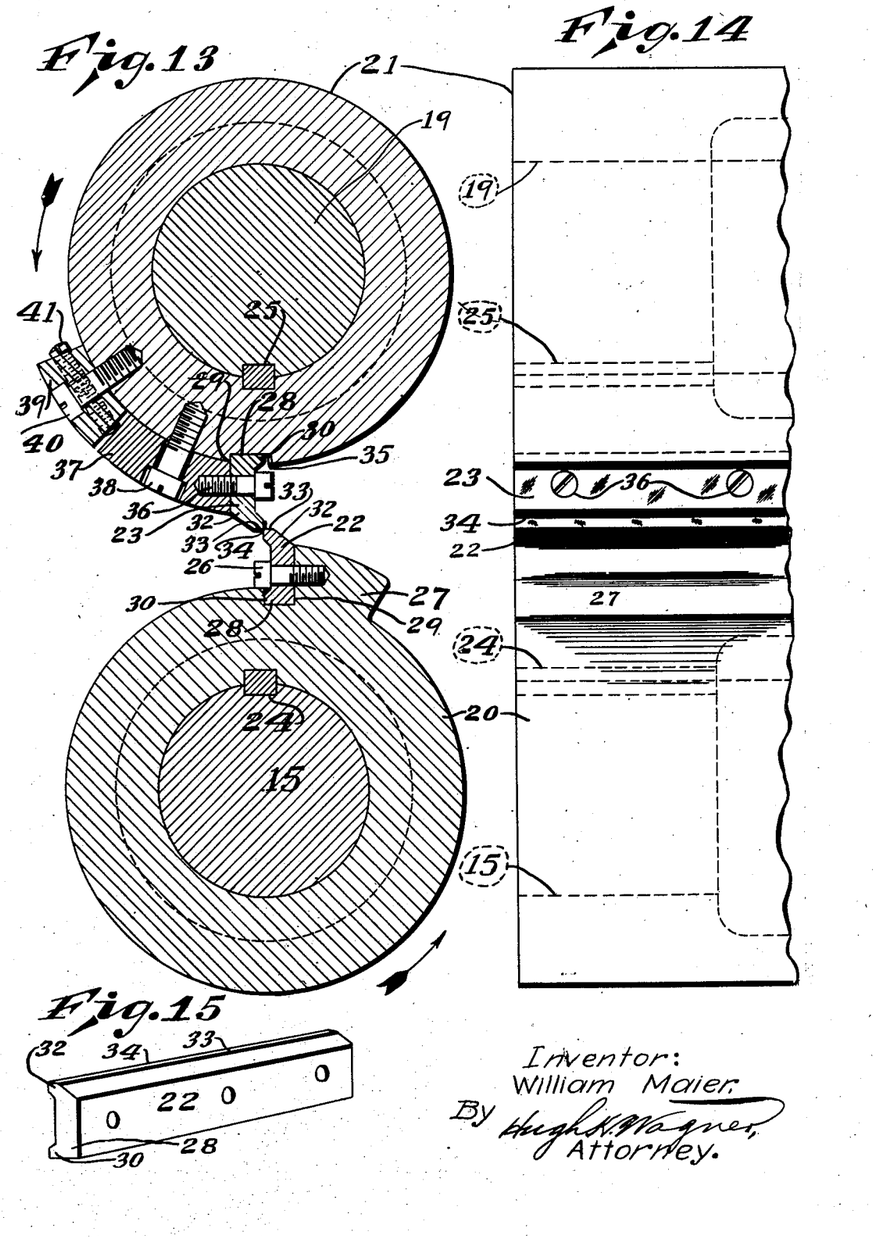
Fig. 13 is a sectional view on an enlarged scale showing the cutters or knives and their mode of attachment to the cutter rolls and is a section on the line 13—13 in Fig. 2, looking in the direction indicated by the arrows.
Fig. 14 is a fragmental elevational view of the cutter rolls, showing one of the knives attached to its respective roll.
Fig. 15 is a perspective detail, on a reduced scale, of one of the knives.

The knives 22 and 23, when actuated to cut, engage as shown in Fig. 13, the material to be cut being fed through the timing rolls shown in Fig. 1 to and between rolls 20 and 21.

The knives 22 and 23 are attached helically to their respective rolls 20 and 21, and as thus attached their blades approach nearer toward each other at one end than at the other, as shown in Fig. 2, with the result and for the reason that when the material to be cut is fed between the rolls 20 and 21, a straight cut, i. e., one at a right angle to the length of the material is produced by the co-action of these helically arranged knives, which begin to cut at one edge of the paper or other material by their ends coming together like a pair of shears and continuing such cutting through the material to be cut as the knives 22 and 23 rotate toward each other and as the material to be cut simultaneously travels farther forward.

Roll 20 is keyed at 24 to shaft 15, and roll 21 is keyed at 25 to shaft 19.

Knife 22 is attached by screws 26 to a rib 27 on roll 20, the foot 28 of knife 22 being inserted in a groove or socket 29 whereby the said knife 22 is held very securely against and in connection with the said rib 27. The said foot 28 is provided with an additional extension or toe 30 that rests in the groove 29. Knife 22 is provided with the tongue 32 beveled at 33 to the sharp knife-edge 34, adapted to co-act with the coöperating knife 23 of substantially similar construction.

The foot 28 of knife 23 seats in a groove 35 in the periphery of roll 21, but the said groove 35 is not a tight-fitting groove like the groove 29 in the periphery of roll 20 for knife 22. Knife 23 is thus adjustable forwardly and backwardly in the said groove 35. It is attached by screws 36 to plate 37, which is attached by screws 38 to roll 21. Thus plate 37 is adjustable outwardly and inwardly relative to roll 21. Plate 37 is rendered more secure in its attachment to roll 21 by plate 39, secured by screws 40 to roll 21. Adjusting screws 41 can be moved forwardly or backwardly, thus allowing some forward or backward adjustment of plate 37. Thus knife 23 can, by reason of the secure attachment of plate 37 to roll 21, be adjusted inwardly or outwardly and, by reason of the slight play of plate 37 on screw 38, backward or forward, and the steadying thereof by screws 41 and also more particularly by reason of its attachment by screw 36 to the edge of plate 37 and the extra space left in groove 35 can be adjusted forwardly or backwardly. This provides latitude for compensation for wear of parts.

Gear 42 is constantly rotated by pinion 43 driven by shaft 44, which is driven by pulley 45. As hereinbefore stated, and as hereinafter more fully described, shaft 15 does not rotate, although gear 42 (loosely mounted thereon) revolves continuously until the disengagement of rod 10 from shoulder 11 allows the clutch to take hold and thus permits gear 42 to drive shaft 15.

Figure 3:
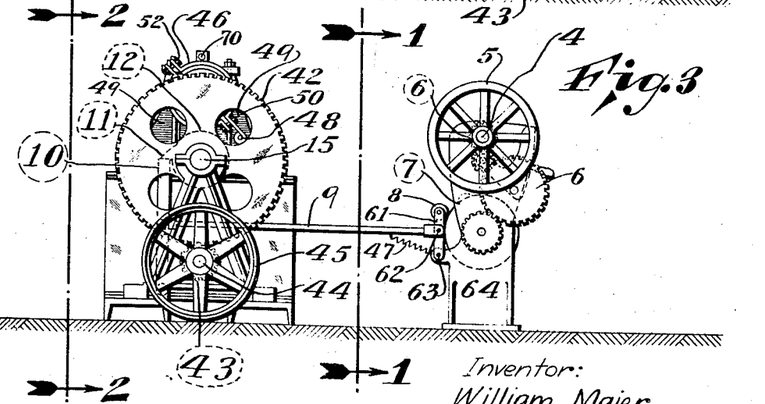
Fig. 3 is an end elevation of the subject-matter of both Figs. 1 and 2.
Figure 4:
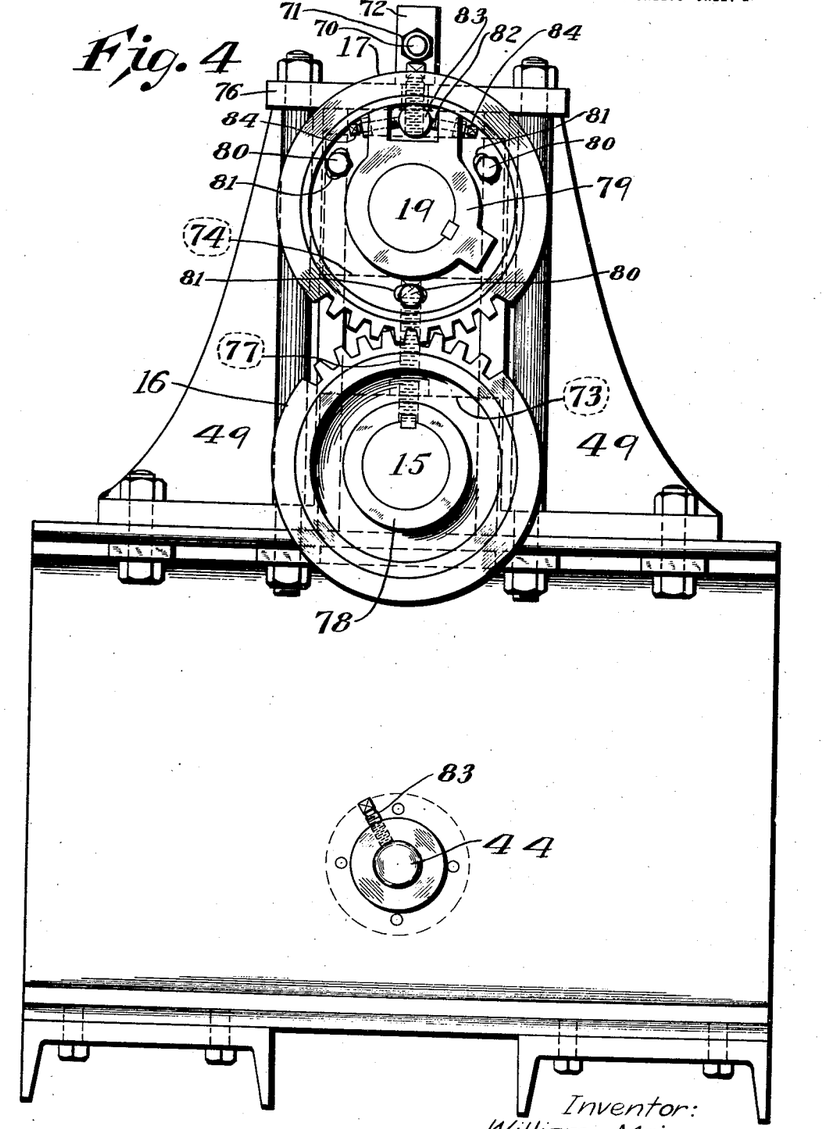
Fig. 4 is an end elevation at the opposite end of Fig. 2.
Figure 5:
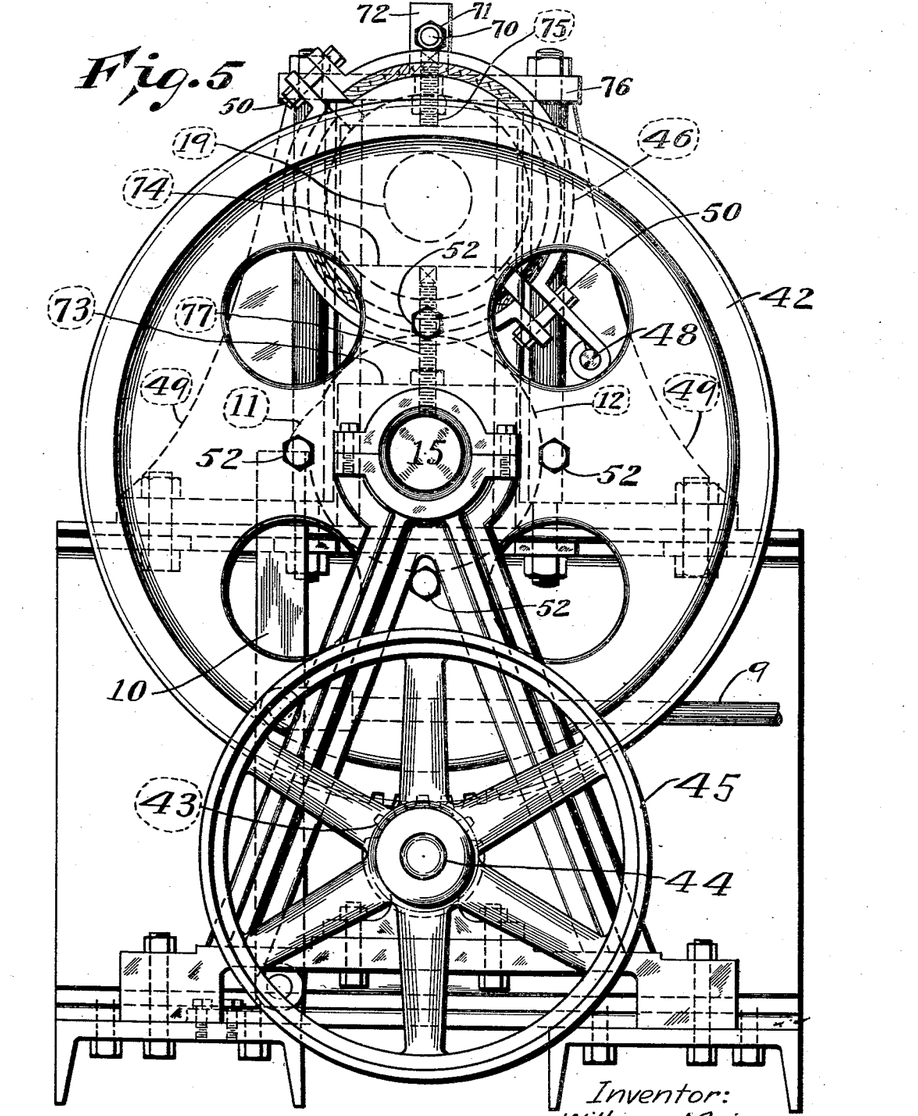
Fig. 5 is an end elevation on an enlarged scale as compared to Fig. 2 of the right-hand end thereof.
Figure 6:
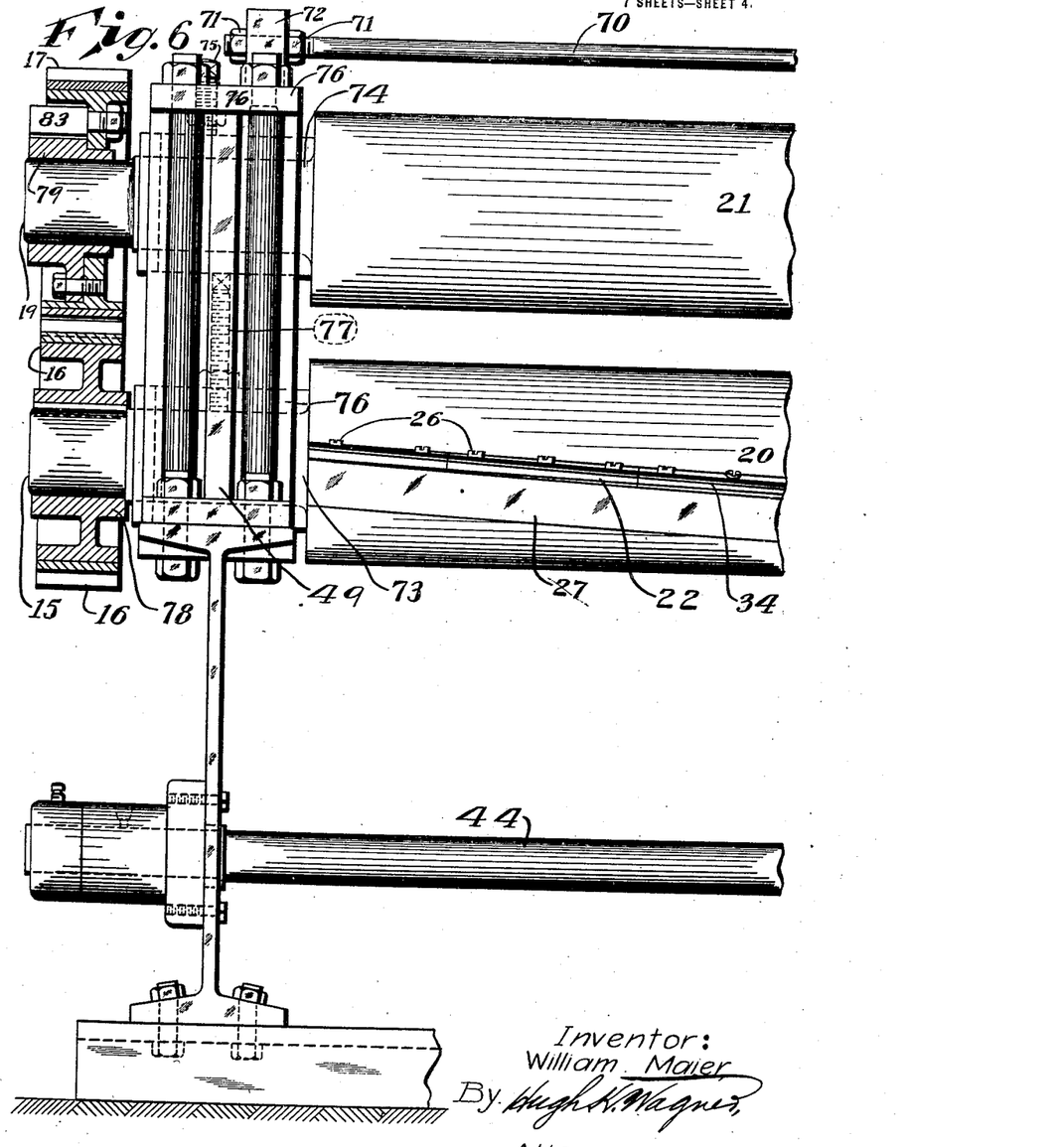
Fig. 6 is a view on an enlarged scale in elevation of the left-hand part of Fig. 2 (certain parts being in section)
Figure 7:
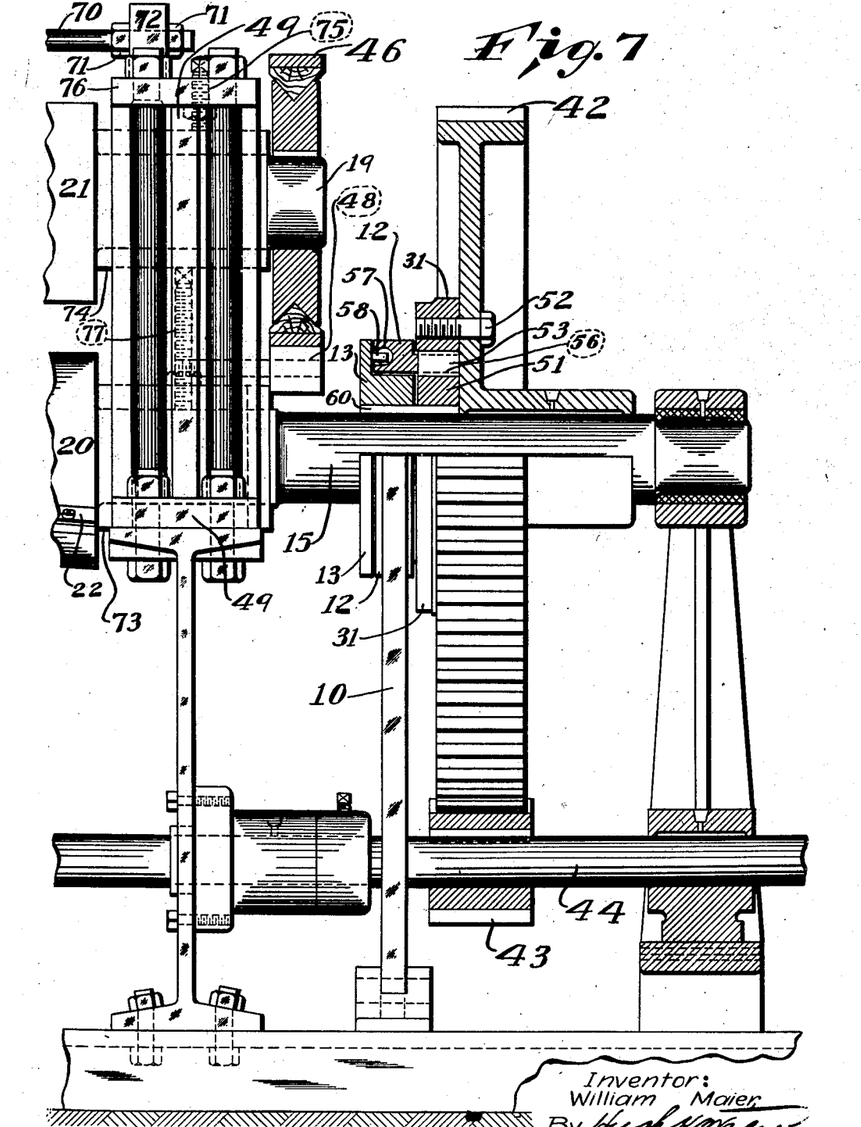
Fig. 7 is a side elevation on an enlarged scale of the right hand end of Fig. 2.
Figure 8:
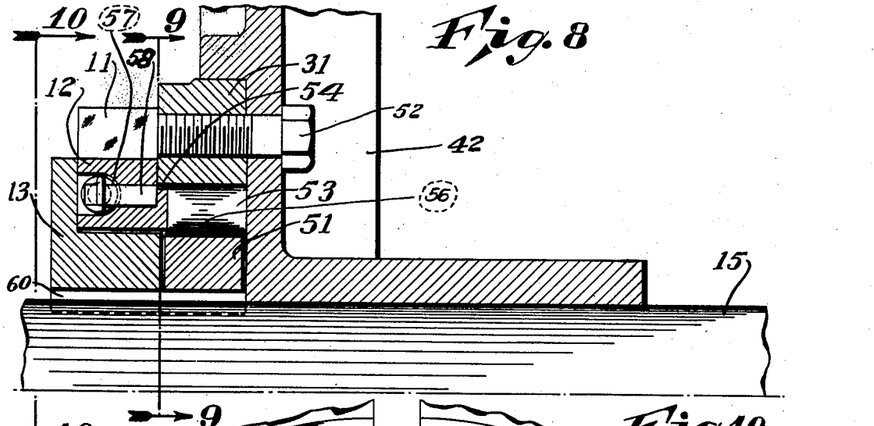
Fig. 8 is an enlarged detail view, in section, of part of the cutter clutch mechanism.
Figure 9:
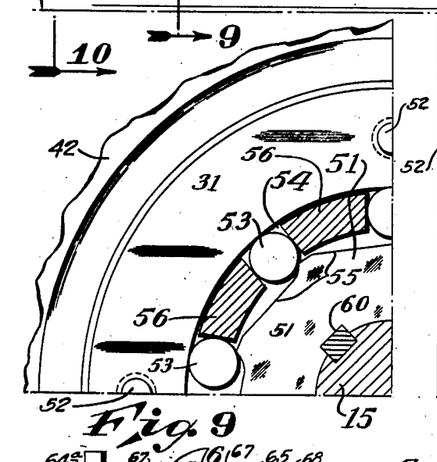
Fig. 9 is a detail view, partly in section, of another part of the cutter clutch mechanism, taken on line 9—9 in Fig. 8.
Figures 10, 12:
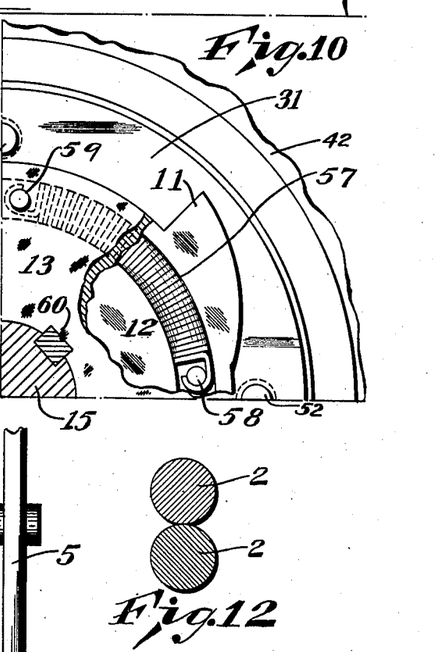
Fig. 10 is a detail view, partly in section, and part being broken away, of still another part of the cutter clutch, taken on the line 10—10 in Fig. 8.
Fig. 12 is a sectional view on the line 12—12 in Fig. 1.

The band-brake 46 is in constant engagement with roll 21 and thus assists in stopping the cutter-rolls approximately prior to the time when the pull of spring 47 has restored rod 10 to the position shown in Figs. 3 and 5. This band-brake 46 is fastened by pin 48 to bracket 49 and is drawn together by bolt 50.

The above-mentioned clutch is constructed and operates as follows: A ring is fastened by screws 52 to gear 42. Rollers 53, located in the notches 54 and between legs 56 in the cage 12, are adapted to roll on the inclined edges 55 of the notches in disk 51, which disk 51 is located within an opening through roller-cage 12, adapted to hold the rollers 53 in notches 54. A spring 57 is attached by spring-post 58 to the cage 12, and by spring-post 59 to the clutch disk 13. Cage 12 normally runs loose unattached to gear 42, but when the push of rod 9 upon rod 10 disengages the end of rod 10 from shoulder 11, spring 57 pulls cage 12 in one direction toward disk 13, with the result that rollers 53 travel each one up its adjacent incline 55 on the peripheral edge of disk 51 with the result that each roller is thus forced into contact with the inner periphery of ring 31, thereby producing a wedging effect that causes disk 13, ring 31, and roller-cage 12 to travel as one, thereby rotating shaft 15 because disk 51 and clutch disk 13 are both keyed thereto by key 60, while ring 31 is attached by screws 52 to gear 42. Shoulder 11 is on the cage 12.

Roller 8 is mounted on a member 61, which is pivoted at 62 to rod 9 and again at 63 to the standard 64 or other support for gears 6 and shaft 4.

Figures 11, 16:
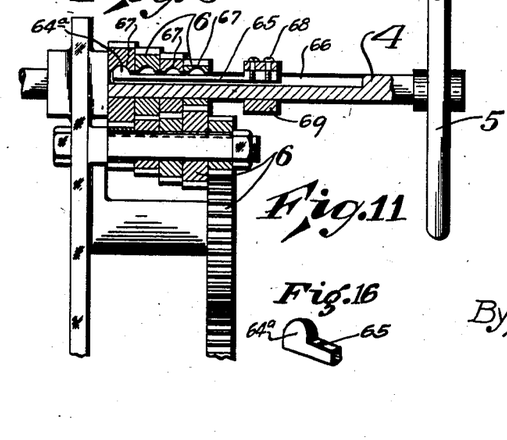
Fig. 11 is a sectional view of the right-hand end of Fig. 1, showing the timing gears for the stock feed, which determines the length of the piece or pieces that will be cut off.
Fig. 16 is a perspective detail of the head of the timing gears key.

To adjust the time-gears 6, for the purpose hereinabove described, key 64ª on the outer end of spring-arm 65 is located in groove 66 in shaft 4. As a key seat for the key head 64ª an internal groove 67 is provided in each of the time-gears 6, which key seats fit the head of key 64ª. As best shown in Fig. 16, the said head is curved. Spring-arm 65 is attached by screws 68 to collar 69, which is slidable on shaft 4. When the head of key 64ª is resting in the groove 67, as shown in Fig. 11, an outward pull of collar 69 toward wheel 5 causes the head of key 64ª to jump out of groove 67 and to ride over the ledge into the next adjoining groove 67. A movement of collar 69 in either direction causes similar movement of the said head of key 64ª, as the same is borne by spring-arm 65.

The tie-rod 70 binds the machine together, and is fastened by nuts 71 at each of its ends to uprights 72.

To adjust the distance between the centers of the shafts 15 and 19, which are journaled in boxes 73 and 74 located between brackets 49, a set-screw 75 is threaded in plate 76 and extends through the said plate and projects to the top of box 74. Box 74 serves as a bearing for shaft 19.

Another set-screw 77 is threaded in box 73, in which is journaled shaft 15. Set-screw 77 is of such length that the screw head reaches to the bottom of box 74, and the distance between boxes 73 and 74 can be adjusted by means of this screw 77, set-screw 75 serving as a lock-screw.

The shafts 15 and 19 are journaled respectively in boxes 73 and 74. Gear 16 is provided with a hub 78, and gear 19 is provided with a hub 79. The connection between these gears and their respective hubs is by means of bolts or studs 80 passing through slots 81, whereby means is provided for adjustment of the gears relative to their respective rolls for the purpose of allowing adjustment of knives 22 and 23 relative to each other. Thus an additional adjustment is provided for the said knives in addition to that permitted by boxes 73 and 74 and set-screws 75 and 77.

A groove or notch 82 in the periphery of the hub 79 receives a pin 83, which is borne against by set-screws 84 adapted to hold the hub from rotation relative to its respective gear, except when the said set-screws are loosened for purposes of adjustment.

Having thus described this invention, I hereby reserve the benefit of all changes in form, arrangement, order, or use of parts, as it is evident that many minor changes may be made therein without departing from the spirit of this invention or the scope of the following claims.

I claim:

1. In a machine of the character described, the combination of a timer having a rotary member bearing a cam, a movable member adapted to be actuated by the said cam, and having a spring for returning the same to initial position, a movable member adapted to be actuated by the said first-mentioned member and normally engaging a stop, a rotatable member bearing the said stop, a shaft on which the said rotatable member is loosely mounted, a gear loosely mounted on the said shaft but having means in connection therewith adapted to clutch the said shaft when the said movable member is disengaged from the said stop, and cutters adapted to be operated by the said shaft when the same is driven by the said gear.

2. In a machine of the character described, the combination of a timer having a rotary member bearing a cam, a movable member adapted to be actuated by the said cam, a movable member adapted to be actuated by the said first-mentioned member and normally engaging a stop, a rotatable member bearing the said stop, a shaft on which the said rotatable member is loosely mounted, a gear loosely mounted on the said shaft but having means in connection therewith adapted to clutch the said shaft when the said movable member is disengaged from the said stop, and cutters adapted to be operated by the said shaft when the same is driven by the said gear.

3. In a machine of the character described, the combination of a timer having a rotary member bearing a cam, a movable member adapted to be actuated by the said cam, and having a spring for returning the same to initial position, a movable member adapted to be actuated by the said first-mentioned member and normally engaging a stop, a rotatable member bearing the said stop, a shaft on which the said rotatable member is loosely mounted, a gear loosely mounted on the said shaft but having means in connection therewith adapted to clutch the said shaft when the said movable member is disengaged from the said stop, and cutters adapted to be operated by the said shaft when the same is driven by the said gear, the said first-mentioned movable member being provided with a roller adapted to be contacted with by the said cam.

4. In a machine of the character described, the combination of a timer having a rotary member bearing a cam, a movable member adapted to be actuated by the said cam, and having a spring for returning the same to initial position, a movable member adapted to be actuated by the said first-mentioned member and normally engaging a stop, a rotatable member bearing the said stop, a shaft on which the said rotatable member is loosely mounted, a gear loosely mounted on the said shaft but having means in connection therewith adapted to clutch the said shaft when the said movable member is disengaged from the said stop, cutters adapted to be operated by the said shaft when the same is driven by the said gear, the said first-mentioned movable member being provided with a roller adapted to be contacted with by the said cam, and the said roller being mounted upon a pivoted member.

5. In a machine of the character described, the combination of a timer having a rotary member bearing a cam, a movable member adapted to be actuated by the said cam, and having a spring for returning the same to initial position, a movable member adapted to be actuated by the said first-mentioned member and normally engaging a stop, a rotatable member bearing the said stop, a shaft on which the said rotatable member is loosely mounted, a gear loosely mounted on the said shaft but having means in connection therewith adapted to clutch the said shaft when the said movable member is disengaged from the said stop, cutters adapted to be operated by the said shaft when the same is driven by the said gear, the said first-mentioned movable member being provided with a roller adapted to be contacted with by the said cam, the said roller being mounted upon a member pivoted to the said first-mentioned movable member.

6. In a machine of the character described, the combination of a timer having a rotary member bearing a cam, a movable member adapted to be actuated by the said cam, and having a spring for returning the same to initial position, a movable member adapted to be actuated by the said first-mentioned member and normally engaging a stop, a rotatable member bearing the said stop, a shaft on which the said rotatable stop, a shaft on which the said rotatable member is loosely mounted, a gear loosely mounted on the said shaft but having means in connection therewith adapted to clutch the said shaft when the said movable member is disengaged from the said stop, and cutters adapted to be operated by the said shaft when the same is driven by the said gear, the said first-mentioned movable member being provided with a roller adapted to be contacted with by the said cam, the said roller being mounted upon a member pivoted to the said first-mentioned movable member and also to the support that bears the said cam.

7. In a machine of the character described, the combination of a timer having a rotary member bearing a cam, a movable member adapted to be actuated by the said cam, a movable member adapted to be actuated by the said first-mentioned member and normally engaging a stop, a rotatable member bearing the said stop, a shaft on which the said rotatable member is loosely mounted, a gear loosely mounted on the said shaft but having means in connection therewith adapted to clutch the said shaft when the adapted to clutch the said shaft when the said movable member is disengaged from the said stop, and cutters adapted to be operated by the said shaft when the same is driven by the said gear, the said cutters comprising a pair of knives oppositely helically disposed.

8. In a machine of the character described, the combination of a timer having a rotary member bearing a cam, a movable member adapted to be actuated by the said cam, a movable member adapted to be actuated by the said first-mentioned member and normally engaging a stop, a rotatable member bearing the said stop, a shaft on which the said rotatable member is loosely mounted, a gear loosely mounted on the said shaft but having means in connection therewith adapted to clutch the said shaft when the said movable member is disengaged from the said stop, and cutters adapted to be operated by the said shaft when the same is driven by the said gear, the said cutters comprising a pair of knives oppositely helically disposed, one of the said knives being fixed to the other adjustably.

9. In a machine of the character described, the combination of a timer having a rotary member bearing a cam, a movable member adapted to be actuated by the said cam, a movable member adapted to be actuated by the said first-mentioned member and normally engaging a stop, a rotatable member bearing the said stop, a shaft on which the said rotatable member is loosely mounted, a gear loosely mounted on the said shaft but having means in connection therewith adapted to clutch the said shaft when the said movable member is disengaged from the said stop, and cutters adapted to be operated by the said shaft when the same is driven by the said gear, the said cutters comprising a pair of knives oppositely helically disposed, each of the said knives being attached to rolls.

10. In a machine of the character described the combination of a timer having a rotary member bearing a cam, a movable member adapted to be actuated by the said cam, a movable member adapted to be actuated by the said first-mentioned member and normally engaging a stop, a rotatable member bearing the said stop, a shaft on which the said rotatable member is loosely mounted, a gear loosely mounted on the said shaft but having means in connection therewith adapted to clutch the said shaft when the said movable member is disengaged from the said stop, and cutters adapted to be operated by the said shaft when the same is driven by the said gear, the said cutters comprising a pair of knives oppositely helically disposed, each of the said knives being attached to rolls, and each of the said rolls containing a groove adapted to receive the foot of its respective knife.

11. In a machine of the character described, the combination of a timer having a rotary member bearing a cam, a movable member adapted to be actuated by the said cam, a movable member adapted to be actuated by the said first-mentioned member and normally engaging a stop, a rotatable member bearing the said stop, a shaft on which the said rotatable member is loosely mounted, a gear loosely mounted on the said shaft but having means in connection therewith adapted to clutch the said shaft when the said movable member is disengaged from the said stop, and cutters adapted to be operated by the said shaft when the same is driven by the said gear, the said cutters comprising a pair of knives oppositely helically disposed, each of the said knives being attached to rolls, each of the said rolls containing a groove adapted to receive the foot of its respective knife, and one of the said grooves fitting the foot of its knife and the other of said grooves being larger than the foot of its knife.

12. In a machine of the character described, the combination of a timer having a rotary member bearing a cam, a movable member adapted to be actuated by the said cam, a movable member adapted to be actuated by the said first-mentioned member and normally engaging a stop, a rotatable member bearing the said stop, a shaft on which the said rotatable member is loosely mounted, a gear loosely mounted on the said shaft but having means in connection therewith adapted to clutch the said shaft when the said movable member is disengaged from the said stop, and cutters adapted to be operated by the said shaft when the same is driven by the said gear, the said cutters comprising a pair of knives oppositely helically disposed, each of the said knives being attached to rolls, each of the said rolls containing a groove adapted to receive the foot of its respective knife, one of the said grooves fitting the foot of its knife, the other of the said grooves being larger than the foot of its knife, there being a projection upon the said roll having the said fitting groove and the said knife being bound to the said projection by screws.

13. The combination of oppositely helically disposed knives, one pair of ends of which is adapted to begin cutting a forwardly-traveling piece of material before any other part of either knife comes into cutting engagement with the said material, but which cutting continues continuously and progressively along the edges of the said knives, the said knives being rotatably mounted, means for intermittently rotating the said knives, the said means consisting of a shaft, a clutch having a stop and adapted, when the said stop is disengaged, to impart rotary motion to the said shaft, power means in constant connection with the said shaft, means for engaging the said stop, and means for intermittently disengaging the said means from the said stop, the said clutch consisting of a ring having rollers located along the inner periphery, a roller-cage located in juxtaposition thereto, a notched disk within the said cage and keyed to the said shaft, a clutch disk keyed to the said shaft, the said rollers lying between the said disk and the said ring, and a spring adapted to exert tension on the cage and to move the same, whereby the said rollers will frictionally engage between the said disk and the said ring.

In testimony whereof I hereunto affix my signature.

WILLIAM MAIER.